United States Patent [19]
Cowgill et al.

[11] Patent Number: 5,471,561
[45] Date of Patent: Nov. 28, 1995

[54] AUTOMATED STORAGE LIBRARY WITH ROTATABLE ARM AND OBLIQUE ANGLE EFFECTORS

[75] Inventors: Richard B. Cowgill, Eastleigh; David C. Teale, Winchester, both of England

[73] Assignee: International Business Machines Corporation, Armonk, N.Y.

[21] Appl. No.: 63,485

[22] Filed: May 19, 1993

[30] Foreign Application Priority Data

Aug. 8, 1992 [GB] United Kingdom .................. 9216874

[51] Int. Cl.⁶ .............................. G06F 15/46; B65G 1/06
[52] U.S. Cl. .................. 395/82; 395/80; 395/93; 360/92; 360/93; 901/31
[58] Field of Search .................. 395/82, 80, 93; 901/31; 360/92, 93

[56] References Cited

U.S. PATENT DOCUMENTS

| | | | |
|---|---|---|---|
| 4,655,676 | 4/1987 | Jannborg et al. | 901/31 |
| 4,864,438 | 9/1989 | Munro | 360/92 |
| 4,907,889 | 3/1990 | Simone | 360/92 |
| 4,932,826 | 6/1990 | Moy et al. | 360/92 |
| 5,015,139 | 5/1991 | Baur | 414/281 |
| 5,065,265 | 11/1991 | Pierrat | 360/92 |
| 5,133,632 | 7/1992 | Aramaki et al. | 360/92 |
| 5,143,193 | 9/1992 | Geraci | 194/212 |
| 5,323,327 | 6/1994 | Carmichael et al. | 360/92 |

FOREIGN PATENT DOCUMENTS

| | | | |
|---|---|---|---|
| 0506489 | 3/1992 | European Pat. Off. | G11B 15/68 |
| 3843216 | 12/1988 | Germany | G11B 15/68 |
| 9204713 | 3/1992 | WIPO | G11B 15/68 |

*Primary Examiner*—George B. Davis
*Attorney, Agent, or Firm*—M. W. Schecter

[57] ABSTRACT

An automated storage library includes a robotic picker which moves linearly between linear and/or carousel storage shelves to transport data storage cassettes between the shelves and a data transfer device. The picker arm can swing in a vertical arc to access the tape stores on either side of its linear path. The arm also has at least one rotatable wrist and a pair of end effectors. A data storage cassette may be extracted from a data transfer device, the wrist rotated 180°, and a new cassette inserted. This reduces the number of times the robot has to visit the tape stores. The vertical arc movement of the picker arm provides for accurate orientation of the effectors with respect to the shelves and the data transfer devices.

8 Claims, 6 Drawing Sheets

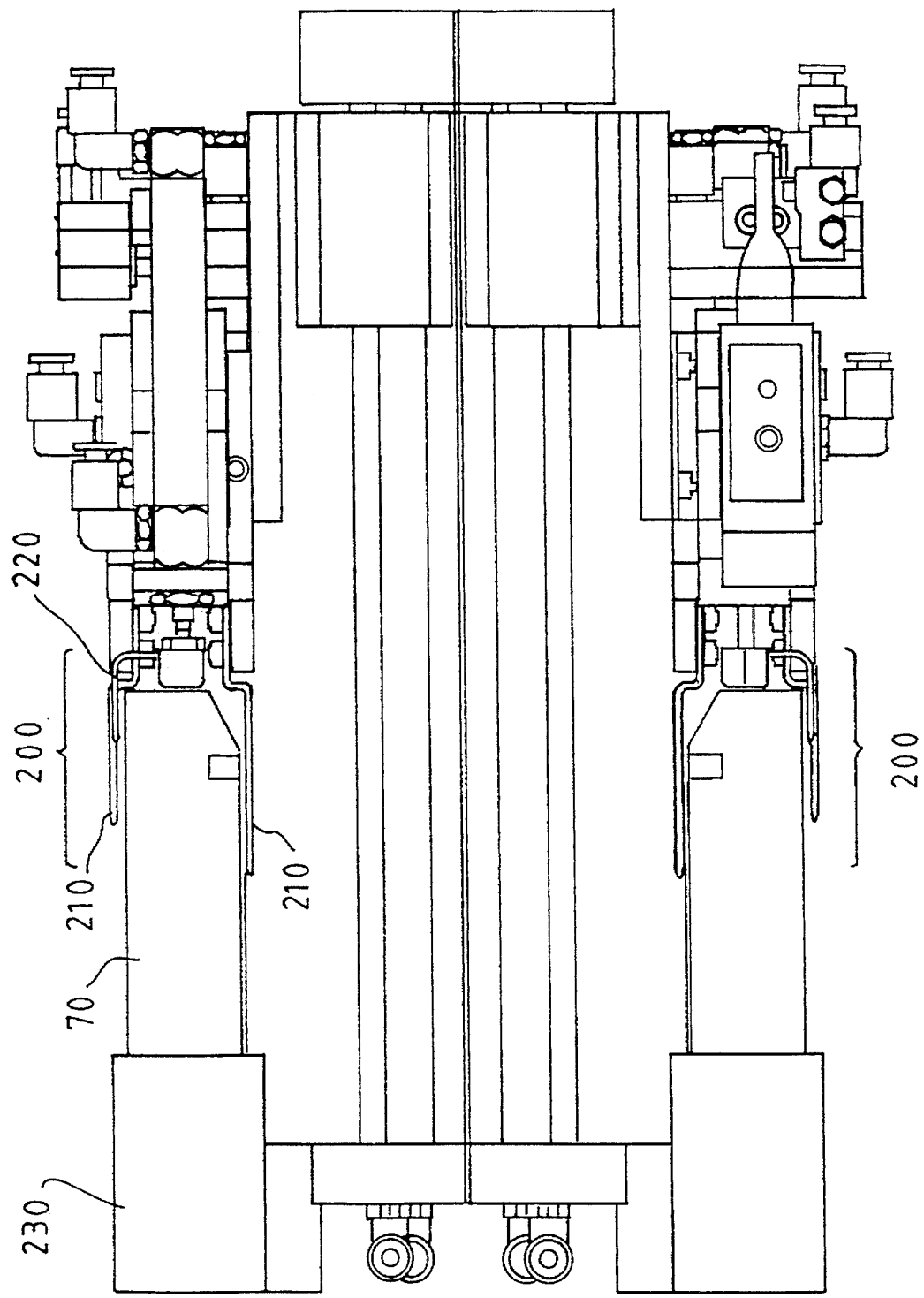

AUTOMATED STORAGE LIBRARY WITH ROTATABLE ARM AND OBLIQUE ANGLE EFFECTORS

BACKGROUND OF THE INVENTION

1. Field of the Invention

The present invention relates to a data storage and retrieval system. More particularly the present invention relates to a robotic system for storing and retrieving large amounts of data and to a robot for use in such a system.

2. Discussion of the Related Art

It is a constant aim in data processing to provide means for data storage which is inexpensive and readily accessible to an operator of the data processing system. Storing very large amounts of data in main memory microchips is very expensive. Data may also be stored on peripheral storage devices which include magnetic tape storage devices, magnetic direct access storage devices (DASD) and optical storage devices. In some applications the amount of information which needs to be retained is vast and numerous disks or tapes are required for storing it. Such tapes and disks have, in the past, been stored in libraries and loaded into peripheral storage devices manually before being accessed by a data processing system. This of course has an undesirable impact on the amount of time taken for a data processing system to access data stored in the library and furthermore, human labor is expensive.

Automated storage libraries have been developed to manage the storage of large amounts of tapes or disks with human intervention only being required for maintenance and fault fixing. An automated storage library is usually a memory subsystem of a larger data processing system. An automated storage library usually includes: a plurality of storage shelves containing cells or slots for retaining data storage media such as magnetic tapes, magnetic disks or optical disks; a robotic picker mechanism; and one or more peripheral storage devices for transferring data between the magnetic storage media and the main data processing system. When data is required by the data processing system the robotic picker is instructed to retrieve a data storage medium and load it into a peripheral storage device so that data may then be accessed by the data processing system. The data storage media are usually stored in a cassette or cartridge so that they are more easily handled and less likely damaged by the robotic picker mechanism. Automated storage libraries are usually enclosed within secure housing to reduce contamination on the storage media and prevent personnel from inadvertently interfering with the robot picker mechanism.

An example of an automated storage library is the 3850 Mass Storage Subsystem for the storage and retrieval of magnetic tape modules which was introduced in the 1970's by IBM Corporation. More recently, automated storage libraries for magnetic disks and optical disks have been introduced. Modern data processing has reduced the amount of time taken to transfer data from a peripheral storage device to the central processor of the data processor. The time taken to fetch a data storage medium from a storage cell and load it into a peripheral storage device is limited by the capabilities of the robotic picker mechanism.

US-A-4,907,889 describes a video cassette library retrieval and sequencing system. In this system the robot picker mechanism is secured to the floor between a video cassette machine and a rotary cassette carousel which holds the video cassettes. The rotary cassette carousel is arranged so that each cassette slot can be brought into a position which is accessible by the picker mechanism. The picker mechanism includes a pair of angularly offset cassette gripper elements which can be operated independently of each other and are mounted on a cassette transfer arm which is itself mounted on the central column of the robot. The pair of gripper elements are mounted on the cassette transfer arm for rotary movement along a predetermined path. Although the robot's retrieval time is favourable because of its limited movement, a disadvantage of this system is that the storage capacity is limited to the number of video cassettes which can be stored on the carousel. In the system described, the storage capacity could be increased by the addition of another rotary cassette carousel but nevertheless the storage capacity is limited to the number of video cassettes which can be stored within reach of the static robot picker mechanism.

An example of an automated storage library in which the storage capacity is not limited by movement of the robotic picker is described in DE-3918198-C1. In the tape archive described, the cassette tapes are stored in a plurality of aligned rotating storage carousels. The tape cassettes are read from tape reader units located near the end of the line of storage carousels or on either side of the line of carousels. The cassettes are delivered to the tape reader units by a pair of robotic pickers, one picker operating on each side of the line of storage carousels. Each robotic picker has a predefined action area which does not overlap with that of the other picker. Each of the rotating carousels can be brought into an access position for the first robot and the second robot. A disadvantage of this library is the expense of providing and maintaining two robots.

SUMMARY OF THE INVENTION

Viewed from one aspect the present invention provides an automated storage library which comprises: a plurality of storage cells for storing data storage cassettes at an oblique angle with respect to the horizontal plane; one or more data transfer devices for transferring data between the data storage cassettes and a host processor; a robotic picker for transporting data storage cassettes between the storage cells and one of the data transfer devices, the robotic picker comprising: a carriage coupled to a drive mechanism for moving the carriage between the storage cells and one of the data transfer devices along a substantially horizontal axis; an arm attached to the carriage so as to be rotatable in arc about the horizontal axis; means for moving the arm in a substantially vertical direction along the carriage; and a first pair of robotic effectors mounted at one end of the arm for gripping data storage cassettes, the effectors being rotatable about an axis substantially parallel to the arm, wherein the robotic effectors are presented at the oblique angle for removal and placement of data storage cassettes in the cells by means of the arcuate and linear movement of the arm.

The robotic picker, in accordance with the present invention, has 4-degrees of freedom. Each of the 4-degrees of freedom serve a specific purpose. The arcuate movement of the arm means that cassettes can be picked from and placed on shelves on both sides of the picker. The arm can swing the cassettes into the correct angle for placing or picking. An advantage of this is that the picker is more efficient in delivering cassettes to the readers which means that the access time for data transfer to the host processing system is kept short.

In accordance with a preferred embodiment of the present invention, the automated storage library further comprises a second pair of robotic effectors mounted at the opposite end of the arm from the first pair, both pairs of effectors being substantially equidistant from the horizontal axis.

An advantage of having two pairs of end effectors is that more data storage cassettes can be transported by the picker at any one time. It is much more efficient, when the cartridges to be transported are located in the near vicinity of each other, to send the picker to fetch four data cassettes than to send it twice to fetch two cassettes. Another advantage is that multiple pickers provide increased fault tolerance so that the library will still be able to operate even though some of the effectors may be non-functional.

In accordance with another embodiment of the present invention, the automated storage library is enclosed within a housing envelope and the robotic picker is mounted on a substantially horizontal axis higher than the storage cells in the enclosure.

An advantage of enclosing the library and suspending the robotic picker from the top is that the library can be assembled almost anywhere without intruding on the floor area. There is no need to bolt down robot guide rails as in the prior art. This also means that there is a reduced risk of injury to personnel entering the library.

In accordance with yet another embodiment of the present invention, movement of the drive mechanism along the substantially horizontal axis and movement of the arm along the carriage is chain driven.

An advantage of the chain driven picker is that it is relatively inexpensive and is accurate.

BRIEF DESCRIPTION OF THE DRAWING

In order that the invention may be fully understood preferred embodiments thereof will now be described, by way of example only, with reference to the accompanying drawings in which:

FIG. 4 shows a side view of one of the end effectors. It shows both grippers holding a cassette between their fingers;

DETAILED DESCRIPTION OF THE PREFERRED EMBODIMENT

The present invention will be described as embodied in an automated tape library (ATL) designed to automatically store and retrieve IBM 3480 type tape cartridges and perform an automated transfer between a tape storage library and an IBM 3480 or IBM 3490 tape drive or other suitable tape drives.

Figure 1:
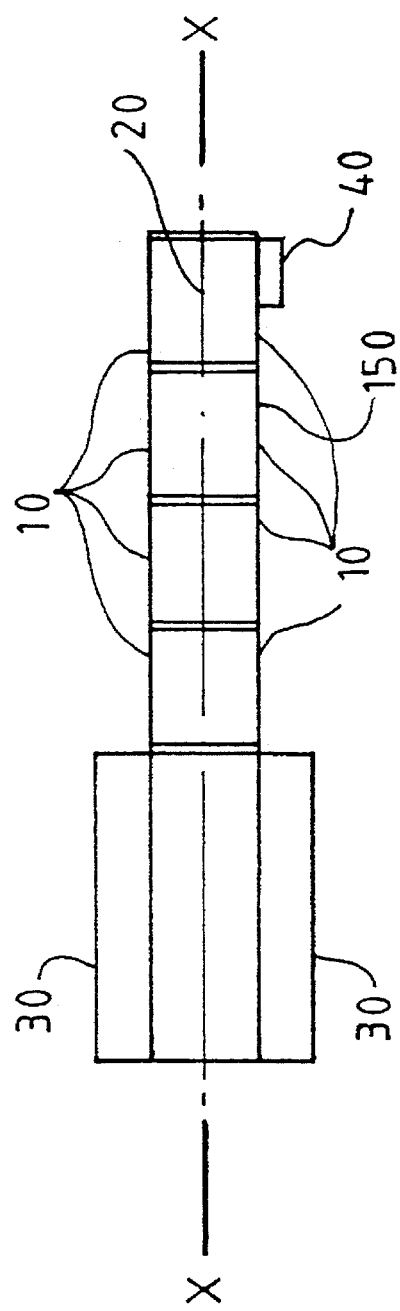
FIG. 1 shows a top plan view of one embodiment of an automated storage library in accordance with the present invention.

FIG. 1 shows a top plan view of an automatic tape library. IBM 3480 type tape cartridges are stored in cells or slots on shelves positioned at 10 on either side of the robot picker's axis of linear horizontal movement which is indicated at 20. Data transfer devices such as IBM 3480 or 3490 tape drives are located, according to one embodiment, at one end of the robotic picker's limit of linear horizontal movement 30. Alternative embodiments incorporating different positions of the storage shelves and tape drives will be described later. The enclosure 40 houses the controller which is preferably an IBM PS/2 computer. The robotic picker or manipulator is instructed to move along axis 20, hereinafter referred to as the x-axis, and pick tape cartridges off the shelves and load them into the tape drives, then return them to the shelves after data has been transferred to/from the host system. Each of the elements of the ATL will now be described.

Robotic Manipulator

Figure 2:
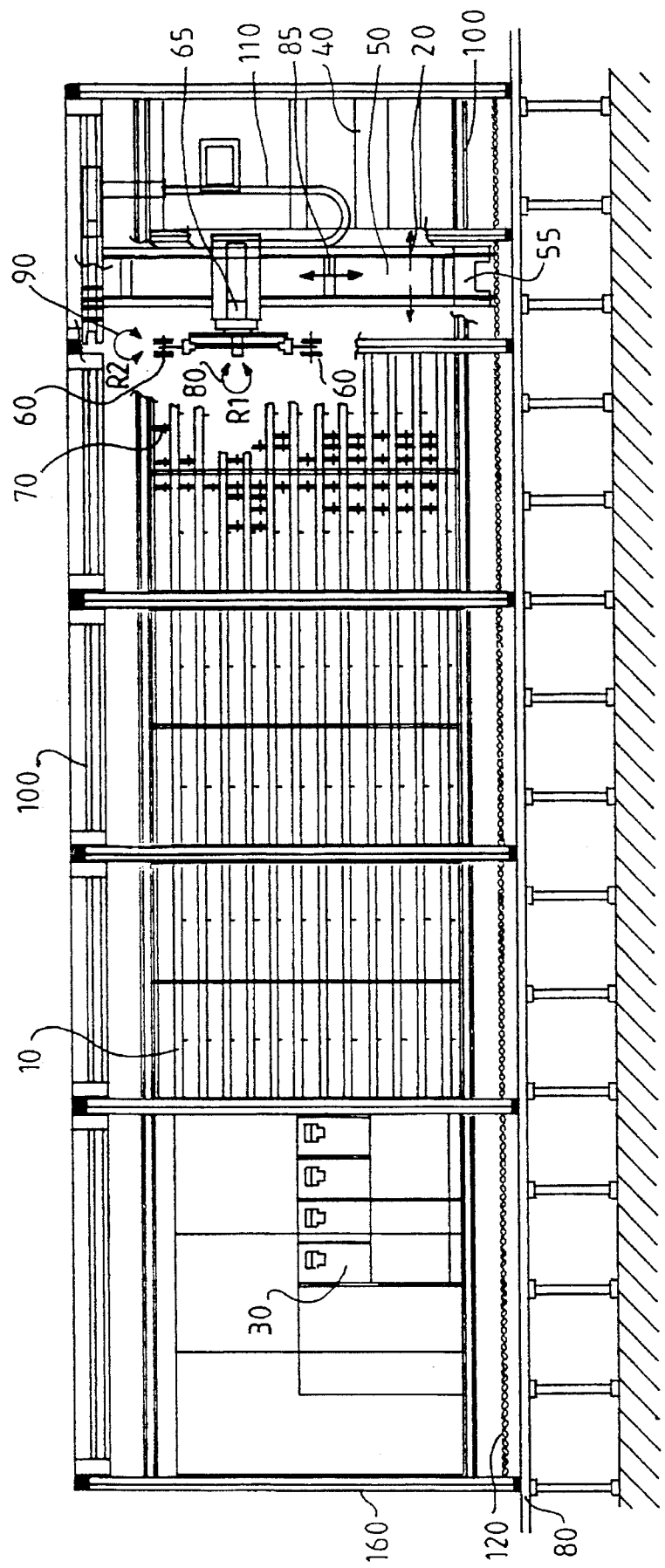
FIG. 2 shows a sectional view along the line x—x of the automated storage library shown in FIG. 1.

FIG. 2 shows a sectional view along the line x—x of the embodiment shown in FIG. 1. The robotic picker mechanism, or manipulator, is a linear robot 50 incorporating four degrees of freedom and preferably fitted with two double end effectors or grippers 60. The effectors are preferably mounted on the ends of arm 65 equidistant from the axis of rotation. In an alternative embodiment the robotic picker may only have one pair of effectors mounted at the end of arm 65. Each end effector is capable of picking, carrying and placing a cartridge 70. Only a few cartridges are shown positioned in slots on the shelves 10 in FIG. 2 in the interest of the clarity of the drawing. For the same reason the shelving in the vicinity of the picker mechanism has been shown partly cut away. It will be understood that in practice the shelves will be filled to capacity with cartridges. The four degrees of freedom available to the picker are defined as follows:

x-axis—linear horizontal movement
z-axis—linear vertical movement
R1-axis—rotational about x-axis
R2-axis—rotational about R1-axis The x-axis 20 is used to transport the picker linearly along the ATL (ie along the path indicated at 20 in FIG. 1). The z-axis 85, shown in FIG. 2, moves the manipulator in a vertical direction in relation to the x-axis. The linear axes are protected at the end positions by shock absorbers or bump stops and double pole limit switches (not shown in FIG. 2).

Figure 3:
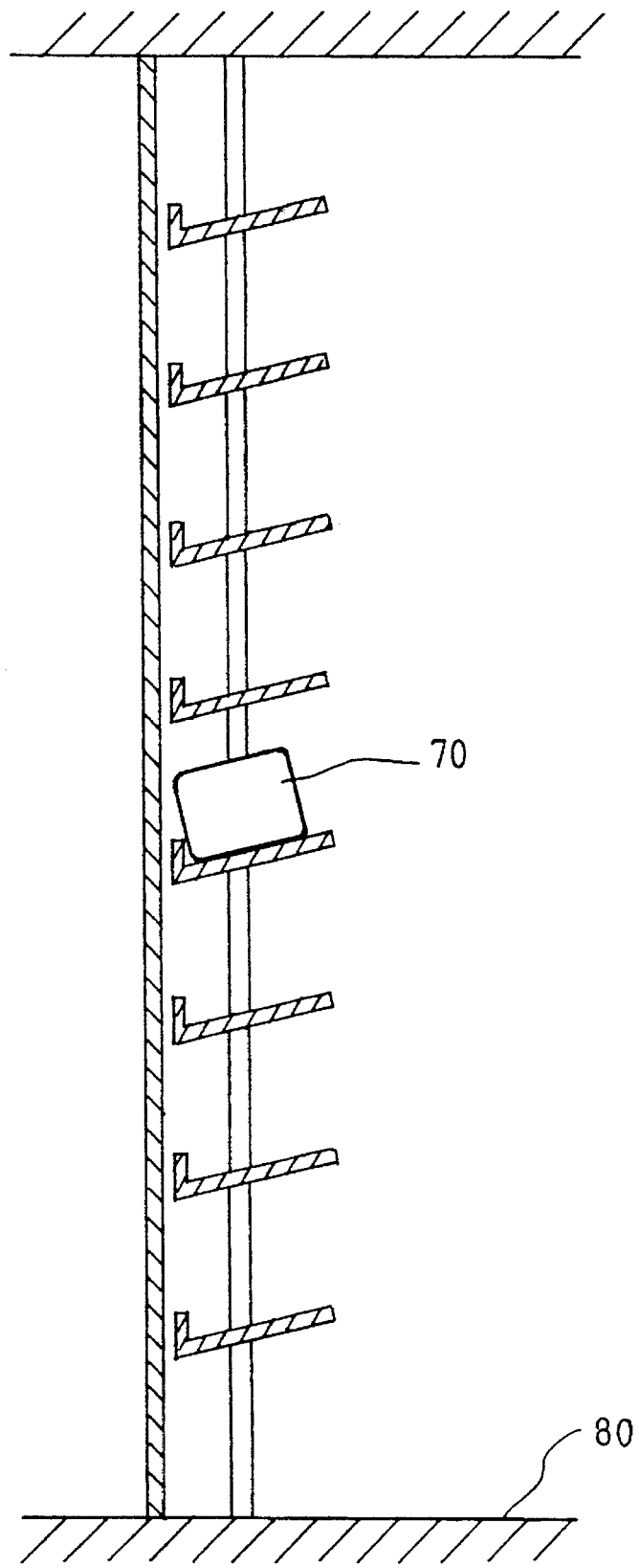
FIG. 3 shows a sectional view along one of the shelving bays of the automated storage library. The line of the section is parallel to the line x—x which is shown in FIG. 1.

The R1-axis 80 is used to present an end effector at the correct orientation for cartridge removal or insertion from a tape drive 30. The R1-axis also enables either pair of end effectors to be used to place and pick cartridges from the shelves on both sides of the ATL. This is particularly useful in that it allows the ATL to continue to operate, but with a slightly degraded service, although some of the end effectors are non-functioning. It also provides the clearance to remove the cartridge from the shelves and correct any misalignment between the grippers. As can be seen from FIG. 2, the cartridges are positioned in a vertical position. The shelves actually tilt downwards away from the centre of the ATL as is shown in FIG. 3. This enables the cartridges to drop back into a cell or slot when they are released from between the grippers and thereby helps to prevent cartridges becoming lodged between grippers. The R1-axis presents the end effectors in front of a slot at the same incline as the shelves. The R1-axis can only be rotated its full amount within the safe z zone. The safe z zone is the area in the middle of the z stroke where the R1-axis is clear to rotate without the gripper interfering with the top or bottom of the ATL machine.

The R2-axis 90 is used to align an end effector to the precise angle of the cartridges on the shelves. It is also used to rotate between the top and bottom of a pair of grippers and correct any misalignment between the grippers.

The grippers are protected from any x,z and R1 movement when picking or placing a cartridge by inhibiting these movements when any gripper is extended. This is achieved using the four rodless cylinder home position sensors (not shown), which control a relay in the main control cabinet or enclosure 40 to inhibit these movements.

The R1-axis of rotation is protected by two safe to rotate proximity sensors located on two separate vertical bars on the z-axis. The bars on the z-axis are offset, one located at the bottom of stroke extended to the middle of the safe z zone, the rotate position sensor. The other bar extends to the extremities of the safe z zone and is positioned in the middle of the z stroke, called the safe z zone sensor. The rotate position sensor is used to determine where the z rotate carriage is positioned on startup. If the switch is high the carriage must move up towards the safe to rotate zone. If the switch is low the carriage must be moved down towards the safe to rotate zone. The safe to rotate zone sensor determines the limits of position when the R1-axis can be rotated.

Four switches are mounted on a cam directly on the R1-axis and their uses will now be described. Two double pole limit switches at both ends of travel. These switches protect the wiring in the flexible drag link from becoming over extended and prevent the R1-axis from making excessive rotational movement. One proximity sensor determines which quadrant of the cam the R1-axis is positioned in on startup. This switch indicates to the control system in which direction the R1-axis must move to reach the home position and therefore protects the cabling from excessive movement. The second cam proximity sensor reacts on two small cams mounted opposite each other on one side of the R1 main cam. This switch allows a small amount of R1 movement which is used to clear the cartridge from the shelves when the main rotational R1 movement is inhibited due to the gripper being extended.

The x,z and R1-axes motions can operate concurrently. The R2-axis moves independently of the other axes. This is to enable the gripper to place and pick cartridges with minimal movement.

ATL Structure

In the preferred embodiment the robot picker structure is suspended on 80 mm aluminium alloy square naturally anodised extrusions. The extrusion, as well as suspending the robot, houses the cartridge library shelves. Robot guide rails 100 are made from standard aluminium alloy extrusions and are positioned above and below the line of shelves on one side of the ATL. An advantage of this is that the ATL structure may stand on an existent firm floor or may stand on a false floor 80 as in the embodiment shown in FIG. 2. There is no danger of disrupting the floor by bolting down guide rails as is the case in other automated storage libraries. Furthermore, by positioning the guide rails above and below the shelves, the ATL of the present invention provides for easier movement within the ATL envelope for maintenance personnel and reduces the likelihood of them accidentally damaging the guide rails.

Movement of the main carriage 55 of the robotic picker along the x-axis is effected by means of a chain 120 and associated cogs on the main carriage. Movement of the effector arm 65 of the robotic picker along the z-axis is also by means of a chain and associated cogs. This chain is housed within the main carriage and the cogs are located on the effector arm.

Cables to the drives and end effectors along the linear x-axis are protected in a flexible trunking system 110 and are wide enough so that all cables and signal wires can lie flat in the trunking. These cables and signal wires terminate at both ends ie. the control cabinet and the R1-axis. The wire used is high flexible shielded cable.

An input/output bay, indicated at 150 in FIG. 1 adjacent the control cabinet is provided for the removal and insertion of cassettes from and to the ATL. The input area is half of a shelving bay and the output area is the other half. Access to the input/output bay is via interlocked doors. A roller shutter door located on the robot side of the input/output shelves is provided to protect an operator accessing the input/output area whilst the robot is operating. Interlocks are provided to prevent an operator from accessing this bay whilst the door is open and the shutter door is open. In operation the operator requests entry to either or both doors by a switch mounted near the doors. For it to be safe for the operator to access this area the roller shutter blind must be closed. The controller releases the shot bolt located in the safety switch assembly mounted above the input/output access doors allowing them to open. The roller shutter doors will not open until the external access doors are fully closed and the shot bolt is in position. The robot will not try to access either input/output area when they are in use by an operator but may continue to access the other shelving bays.

An operator may physically enter the ATL housing via a door indicated at 160 in FIG. 2. This door is controlled using a capture key system, it cannot be opened unless the robot has been deactivated. Once deactivated the captive key located on the front of the control cabinet can be removed which must then be used to release the second captive key located in the door lock.

Software

An IBM PS/2 Model 80 computer running Host Interface software under the OS/2 EE V1.2 operating system provides overall system control and is located in an enclosure 40 within the ATL envelope. The PS/2 controller is connected to the host—typically via a 3270 connection, and receives 3480/90 related messages. These messages are interpreted by the workstation software and ultimately sent out as ATL commands via a serial link to the ATL control hardware.

The ATL software utilizes several of the standard features built into this operating system. Four threads of execution are provided under the IBM OS/2 Operating System, namely:
Host Interface
Control
Robot
User Interface The interface to the MVS host is via the EHLLAPI component of OS/2 EE. The host interface provides a consistent set of commands to the ATL. The host component of the software provides a standard set of commands to the ATL, making the PS/2 ATL software host operating system independent. A handshaking sequence between host and PS/2 computer ensures that commands received from the host are acknowledged upon receipt by the PS/2 computer. The PS/2 computer also notifies the host once the command has been completed by the ATL or if the command was unable to be completed. The interface is also capable of notifying the host of changes in status of the ATL. The PS/2 computer is capable of queuing host commands when demand for cartridges is high.

An SQL database is maintained by the PS/2 computer. The database relates the cartridge volume serial numbers to their physical locations in the storage racks in terms of the servo drive position coordinates. The database also contains "man readable" cartridge position information. Using the OS/2 EE Query Manager, reports and other details of the database can be obtained and hard copies obtained from a printer if required.

A separate thread of execution is used for the robot control. Four base types of move operations are supported namely:

moves to load cartridges from storage locations to tape drives.

moves to unload cartridges from tape drives to storage locations.

moves between storage locations.

composite moves which combine the load and unload operation into the same main axis movement.

Communication between the robot thread and the servo control cards is via an RS232 interface.

An optimiser routine is used to group together host commands so that each of the above moves can be used with multi-gripper combinations to utilize the capability of the robot's gripper system to give improved performance.

A "Presentation Manager" style user interface is also provided. In the normal mode of operation the receipt of commands from the host and their execution by the ATL is fully automatic. Other modes of operation are also supported, principal among these is a maintenance mode which is provided to support additional configuration and diagnostic type commands.

End Effectors

The robotic picker is preferably fitted with two double end effectors indicated at 60 in FIG. 1. Each of these end effectors contain two pneumatic grippers 200 which are shown more clearly in FIG. 4. The grippers are fitted with fingers 210. They are mounted to a fixed plate on a flexible plastic sheet screwed to rodless cylinder carriage.

The rodless cylinder end caps are screwed together with a sheet of mu metal between them to make the end effector assembly. The end effector assembly is in turn attached to the end of the R2 axis shaft by clamping screws.

Each gripper is capable of picking or delivering a cartridge 70. One of the gripper fingers is longer than the other. The longer finger is used to engage the chamfer of a 3480 cartridge and square the cartridge upright prior to the smaller finger touching the side of the cartridge. This enables tighter packing of cartridges in the shelves and therefore a larger volume of cartridges in the same area. The longer finger is also used to assist the pick-up of the cartridge from a 3480 type reader load position. By engaging the cartridge chamfer again the cartridge is aligned to the robot picking position.

The gripper assembly is fitted with a cartridge guide 230. These guides are used for the following:

1. Protect the cartridge from any accidental damage.

2. Insure a 'clean' pick.

3. Guide the cartridge into the gripper.

4. Support the cartridge during an R1-axis move.

The mu metal is an additional precaution to protect the cartridge from the rodless cylinder main magnetic piston if it is ever detached from the carriage.

The rodless cylinders are used to save space. The rodless cylinder carriage movement uses a magnet to connect it to the main cylinder and in the preferred embodiment this magnet flux is set at 2 kg breaking force. The jointing method is used to protect the gripper assembly and cartridge from damage should it be extended in error and collide with any solid object. Sensors are mounted at either end of the rodless cylinder to enable the control system to detect if this error system is encountered.

Figure 5A:
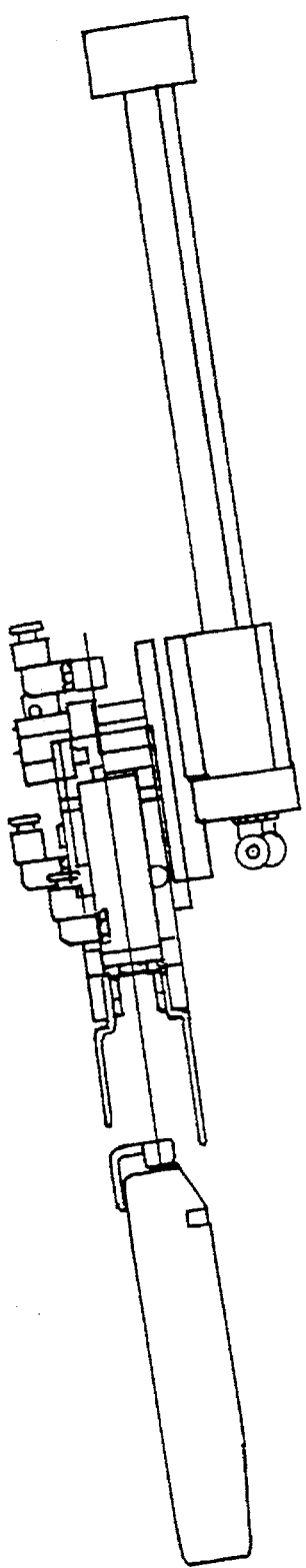
FIGS. 5a and 5b illustrate the operation of inserting a cassette into a tape drive.
Figure 5B:
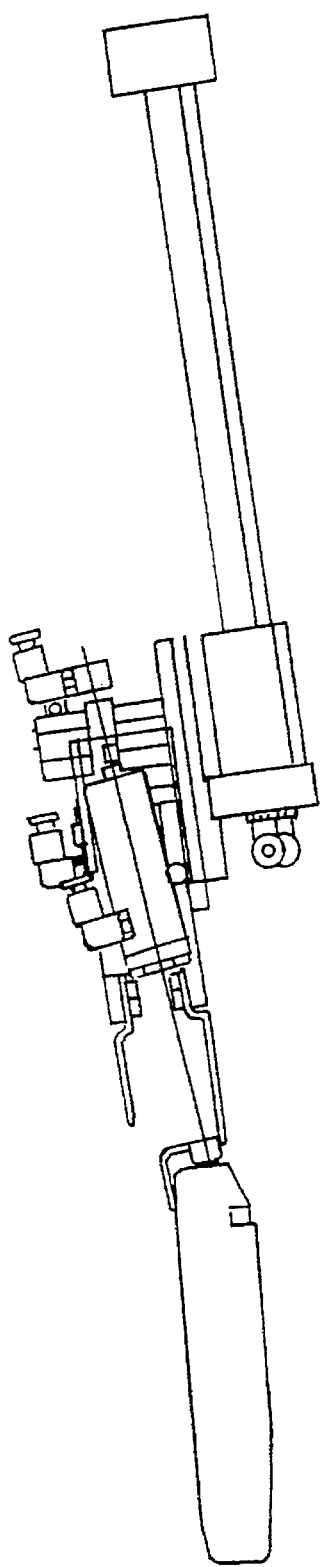

Mounted on the side of each pneumatic gripper is a double acting eject/flip cylinder connected to a bar 220. On top of this bar are two fingers. The bar is guided through two ground rods fitted in solid bearings. Mounted at the back of the eject assembly are two single acting square cylinders controlled by a single, double acting solenoid. The solenoid treats both cylinders as a single, double acting cylinder. These cylinders are used to angle the complete eject assembly. The eject assembly can move both in and out in any gripper position, and flip up and down when the gripper is open and the eject assembly is extended. The eject bar is used during a placement operation to push the cartridge out of the gripper into the shelves. The two fingers mounted on the eject bar are used in conjunction with the flip cylinder to angle the cartridge into the load position in the 3480 type tape reader. In a 3480 type tape reader the tape has to be pushed downwards into a seated operative position after being inserted through the input slot. The action of inserting a cassette into a 3480 type tape reader is shown in FIGS. 5a and 5b. In the case of placing a cartridge into a 3490 type tape reader the flip cylinders are not used. The action of inserting a cassette into a 3490 type tape reader is shown in FIG. 5a.

All end positions of each cylinder are monitored by sensors. In addition to pneumatic motion control sensors there are two part in place sensors. The first is a retro reflective sensor mounted on the side of the robot cartridge guide. It is aimed at the bar code label on the cartridge and set so as it can detect the presence of a label on a cartridge and ignore a cartridge without a label. This sensor is called a part in shelve sensor and is used to verify:

1. That the shelve slot contains a cartridge prior to the bar code reading and pick operation. This provides a means of verifying that the bar code reading operation can commence and prevents the system trying to read an empty position.

2. That the shelve slot is free prior to a placing operation,

3. That the cartridge has a bar code label prior to being accepted from the input gate into the system.

4. That the 3480 tape reader door is either open or closed prior to a placement operation.

The second retro reflective sensor is mounted at one end of the ejector bar. This sensor is used to verify:

1. That the cartridge has not moved significantly in the gripper fingers during any transport operations.

2. That the cartridge is properly placed during a picking operation.

3. That the gripper fingers have not pushed the cartridge out of the shelves.

Each end effector has a bar code reader attached to the z carriage. This reader will be used to verify the identity of the cartridge each time it is accessed.

There are a number of sensors mounted on each end effector, these will now be described:

Each gripper preferably has the following sensors:

Rodless Cylinder In—detects the home position of the gripper.

Rodless Cylinder Out—detects the picking position of the gripper.

Gripper Open—verifies that the gripper is ready to receive a cartridge.

Gripper Closed—verifies that the cartridge has been successfully secured.

Gripper Overtravel—detects if a cartridge has not been secured.

Gripper Part-In-Place—ensures that the cartridges are correctly placed within the gripper.

Shelve Part in Place—detects if a cartridge is occupying a slot in the shelves.

Eject Cylinder Out—to ensure that the eject cylinder has moved to its full stroke.

Eject Cylinder In—To ensure that the eject cylinder has returned to its home position.

Flip Cylinder End of Travel—to ensure that the flip cylinder is returned to the home position.

In the preferred embodiment the three gripper sensing conditions are performed by two sensors. Using a combination of sensors the following states are observed:

Cylinder Out, Gripper Closed, Part-in-Place—detects a successful pick.

Cylinder Out, Gripper Closed, No-Part-in-Place—detects an unsuccessful pick. The cartridge has moved beyond the shelve stop.

Cylinder Out, Gripper Overtravel, No-Part-in-Place—detects that the gripper has pushed the cartridge beyond the back shelve stop.

Cylinder in, Gripper Closed, Part-in-Place—detects that a cartridge has been successfully moved inside the gripper body.

Cylinder In, Gripper Closed, No-Part-in-Place—detects that a cartridge is not correctly located in the gripper.

Cylinder In, Gripper Overtravel, No-Part-in-Place—this state is used to confirm that the gripper is empty during initialisation routines. However if this condition occurs during a pick cycle the gripper must have dropped the cartridge and will be interpreted as an error.

Each end effector has a bar code reader mounted at 90° to the gripper and attached to the z carriage. Each time a cartridge is accessed it is scanned and verified correct by the control system.

Operation

A robot "pick and place" cycle will now be used as a basis to describe a cycle of operation. The following description describes the 'picking' of a cartridge from the racks, the removal of a cartridge from a 3480 tape drive and the placement of the cartridge into the tape drive referred to as a 'Composite Move'. It is assumed that:

a) the 3480 tape drive is situated on the opposite side of the aisle from the cartridge 'picking' position in the storage racks.

b) positional information for the X and Z axes will be communicated to the servo drive controllers from the controlling PS/2 computer.

c) rotational coordinate information resides within the servo controller( s ) memory.

d) a rotation about the R1 axis is not required for the initial cartridge 'pick' from the racks.

e) there are no cartridges currently in any of the grippers.

f) the grippers are initially lying in the horizontal transfer position. The start of the cycle begins with the control system moving the X and Z axes concurrently to the 'pick' position—the shelve location containing the cartridge requested by the control system. The control system will also move the gripper on the R2 axis through 90°, into a vertical position to pick the cartridge. A bar code reader is mounted in a position such that, with the gripper at the cartridge transfer position, it is in position ready to scan the bar code label on the tape cartridge. After reaching the 'pick' position and the part in shelve sensor is active, the servo control program signals—'pick position reached', to the controlling PS/2 computer so that it can command the bar code reader to verify the serial number. If the serial number corresponds to that retrieved from the PS/2 database the PS/2 computer will send a command—'pick cartridge', to the servo/PLC control program. The control system checks that the gripper is in the open position and the gripper then moves in to pick the cartridge. The gripper sensor combination, 'Cylinder In' 'Gripper Closed' and 'Part-In-Place' detect that the cartridge has been successfully picked. The R2 axis rotates upwards to clear the cartridge from the shelve stops and the cartridge is withdrawn to complete the pick operation. The robot then moves to a position outside the tape drive, ready to receive the ejected cartridge from the 3480. Once the Z axis has reached the safe Z position, the R2 axis can be rotated through approximately 187° to the correct approach angle for tape transfer to/from the tape drive. The R1 axis also rotates through 90° to the horizontal plane. At this point in the movement cycle, the empty gripper has been positioned outside the tape drive door, ready to receive the ejected cartridge. A part in shelve sensor mounted on the gripper guide is used to detect if the tape drive door is open or not. If the drive door is not open, the control software tests for the 'open' condition every 2 seconds—up to a maximum timeout period. After the door has opened, the gripper will wait 0.5 seconds before removing the cartridge. The location of the cartridge in the gripper will be checked before any further axes moves are permitted. If the an unsuccessful pick condition is detected the servo controller communicates this information back to the controlling PS/2 computer as an error condition. After the cartridge has been successfully picked the R2 axis will then be rotated through 180 degrees and the X, Z and R2 moved to the place position. The robot will move from the area of the tape drive door and a pneumatic cylinder attached to the tape drive will close the door. The ejected cartridge that has been removed from the 3480 is then transported back to it's shelf location within the library. After the cartridge has been replaced, the control system signals the controlling PS/2 computer to verify the bar coded serial number. If it is incorrect, the tape will be removed from the racks and transported to an output location. An appropriate error message will be generated by the controlling PS/2 computer. After the ATL has finished accessing the tape drives, the cartridges which have been removed from the drives will be taken either, to the output bay, or replaced into the storage shelves. The end effectors are capable of carrying up to 4 cartridges simultaneously. The transport journeys are reduced and time is saved during high utilisation periods. To save power, a configurable feature is preferably provided to allow the manipulator to automatically park in the maintenance bay, with power off the axis motors, when the ATL utilisation is low. The preferred configured time for this feature to be activated is if the host has not requested a command for 10 minutes and all the tape drives are empty. There is a performance deterioration using this feature on the first movement command from the host after automatic shutdown which amounts to a few seconds additional delivery time on the first tape requested. This deterioration is due to having to reset the manipulator position to the control cards before the machine is allowed to move. Other modes of operation are listed below.

Cartridge transports from rack storage locations to the output rack locations; Cartridge transports from input locations to rack storage locations; Cartridge transports from input locations to tape drives; Cartridge transports from tape drives to output locations; and Sequential stepping to successive rack locations. This will be used to compare the physical database with that residing on the PS/2 computer under certain circumstances.

Shell Layout

Figure 6:
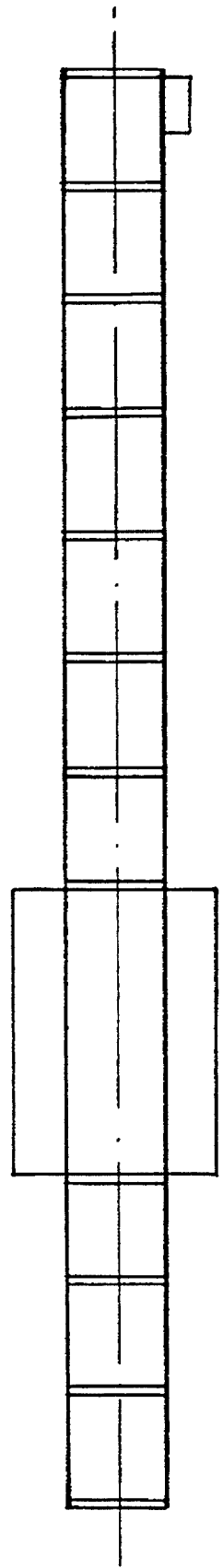
FIG. 6 shows an alternative embodiment of the automated storage library shown in FIG. 1.
Figure 7:
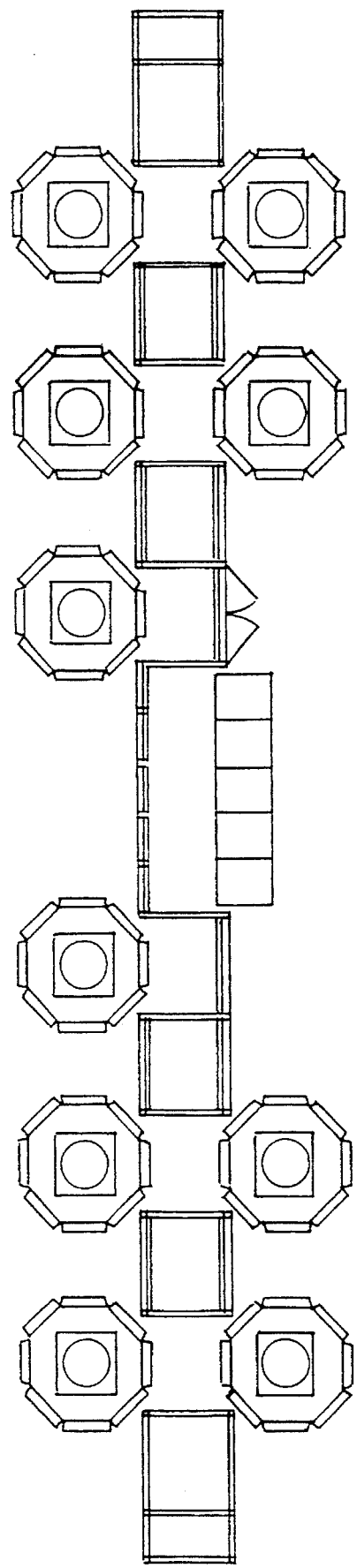
FIG. 7 shows another alternative embodiment of the automated storage library shown in FIG. 1.

The automated storage library in accordance with the present invention is preferably of modular design. FIG. 6 shows an alternative embodiment to that shown in FIG. 1. In FIG. 1 the data transfer devices are located at the end of the robots line of travel. In FIG. 6 shelves are located at the end of the robots's line of travel. FIG. 7 shows yet another embodiment in which some of the linear shelving has been replaced by carousel type shelving. Rotating carousel shelving provides an increase in the storage capacity of data cartridges and still presents the same area of shelving directly to the robot. The arrangement of linear and carousel shelving is a matter of design choice.

While the invention has been particularly shown and described with reference to preferred embodiments thereof, it will be understood by those skilled in the art that various changes in form and details may be made therein without departing from the spirit and scope of the invention:

What is claimed is:

1. An automated storage library comprising:

a plurality of storage cells for storing data storage cassettes at an oblique angle with respect to the horizontal plane;

one or more data transfer devices for transferring data between the data storage cassettes and a host processor;

a robotic picker for transporting data storage cassettes between the storage cells and one of the data transfer devices, the robotic picker comprising:

a carriage coupled to a drive mechanism for moving the carriage between the storage cells and one of the data transfer devices along a substantially horizontal axis;

an arm attached to the carriage so as to be rotatable about the horizontal axis;

means for moving the arm in a substantially vertical direction along the carriage; and a first pair of robotic effectors mounted at one end of the arm for gripping data storage cassettes, the effectors being rotatable about an axis substantially parallel to the arm, wherein the robotic effectors are presented at the oblique angle for removal and placement of data storage cassettes in the cells by means of an arcuate movement and a linear movement of the arm.

2. An automated storage library as in claim 1 further comprising a second pair of robotic effectors mounted at the opposite end of the arm from the first pair, both pairs of effectors being substantially equidistant from the horizontal axis.

3. An automated storage library as in claim 2 wherein the automated storage library is enclosed within a housing enclosure and the robotic picker is mounted on a substantially horizontal axis higher than the storage cells in the enclosure.

4. An automated storage library as in claim 3 wherein movement of the drive mechanism along the substantially horizontal axis and movement of the arm along the carriage is chain driven.

5. An automated storage library as in claim 2 wherein movement of the drive mechanism along the substantially horizontal axis and movement of the arm along the carriage is chain driven.

6. An automated storage library as in of claim 1 wherein the automated storage library is enclosed within a housing enclosure and the robotic picker is mounted on a substantially horizontal axis higher than the storage cells in the enclosure.

7. An automated storage library as in claim 6 wherein movement of the drive mechanism along the substantially horizontal axis and movement of the arm along the carriage is chain driven.

8. An automated storage library as in claim 1 wherein movement of the drive mechanism along the substantially horizontal axis and movement of the arm along the carriage is chain driven.

* * * * *